United States Patent [19]

Bublitz

[11] 3,883,530
[45] May 13, 1975

[54] CHLORINE SUBSTITUTED METHYLPYRIDAZINES

[75] Inventor: Donald E. Bublitz, Concord, Calif.

[73] Assignee: The Dow Chemical Company, Midland, Mich.

[22] Filed: Oct. 20, 1972

[21] Appl. No.: 299,417

[52] U.S. Cl.............. 260/250 A; 71/92; 260/694; 424/250
[51] Int. Cl............................................ C07d 51/04
[58] Field of Search.................. 260/250 A; 424/250

[56] References Cited
UNITED STATES PATENTS

| | | | |
|---|---|---|---|
| 2,846,433 | 8/1958 | Pennino | 260/250 A |
| 3,022,305 | 2/1962 | Carboni | 260/250 A |
| 3,023,208 | 2/1962 | Chambers | 260/250 A |
| 3,169,848 | 2/1965 | Gysin | 260/250 A X |
| 3,420,833 | 1/1969 | Taplin | 260/283 |
| 3,424,754 | 5/1966 | Taplin | 260/290 |
| 3,453,277 | 7/1969 | Ramuz et al. | 260/250 A |

FOREIGN PATENTS OR APPLICATIONS

| | | | |
|---|---|---|---|
| 610,487 | 12/1960 | Canada | 260/250 A X |
| 6,523,023 | 11/1965 | Japan | 260/250 A |
| 1,163,582 | 9/1969 | United Kingdom | 260/250 A |

OTHER PUBLICATIONS

Schonbeck et al., Montashefte fur Chemie, Bd. 99/1 (1968), pages 15–84.

Drayton, et al. 73: 35309s of Chemical Abstracts (1970).

Dewar et al., Chemical Abstract 69: 82102W of J. Chem. Phys. 1968, 49(2), 499–508 (Eng.).

Noller, Chemistry of Organic Compounds, W. B. Saunders Company, Philadelphia, 1965, pp. 467–484.

Castle et al., Heterocyclic Compounds, Vol. 28, "Pyridazines," Interscience, N.Y., 1973, pp. 276, 287, 289, 294 (1973).

*Primary Examiner*—Donald G. Daus
*Assistant Examiner*—Ralph D. McCloud
*Attorney, Agent, or Firm*—S. Preston Jones

[57] ABSTRACT

Chlorine substituted methylpyridazines corresponding to one of the formulas

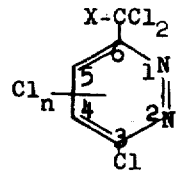 or 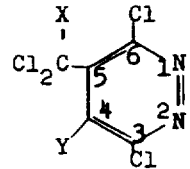

wherein X represents chlorine or hydrogen, Y represents chlorine or hydrogen and n represents the integer 1 or 2 are prepared. These compounds have been found to exhibit high activity in the kill and control of bacterial and fungal organisms.

10 Claims, No Drawings

CHLORINE SUBSTITUTED METHYLPYRIDAZINES

PRIOR ART

Halogenated pyridazine compounds have been prepared and employed as pesticides for the control of plant insect, bacterial and fungal pests as well as chemical intermediates. For example, U.S. Pat. No. 3,453,277 teaches 6-chloro-3-methyl-5-(chloromethyl) pyridazine as an intermediate for preparing coccidiostats; U.S. Pat. No. 3,169,848 teaches 3,6-dichloro-4-methoxy pyridazine as a plant growth inhibitor; Canadian Pat. No. 610,487 teaches di- and trichloropyridazines as plant growth inhibitors; U.S. Pat. No. 2,846,433 teaches tetrahalo pyridazines as herbicides, insecticides, bactericides and fungacides. Other halogenated pyridazines including tetrachloro pyridazine are taught by Schonbeck et al., Monatshefte fur Chemie. Bd 99/1(1968) pages 15–84; however, no utility is taught for the compounds. Japanese Pat. No. 23023/65 teaches 3-chloro-6-trichloromethyl pyridazine as a nitrification inhibitor and a plant hormone material.

SUMMARY OF THE INVENTION

The present invention is directed to chlorine substituted methyl pyridazines corresponding to one of the formulas

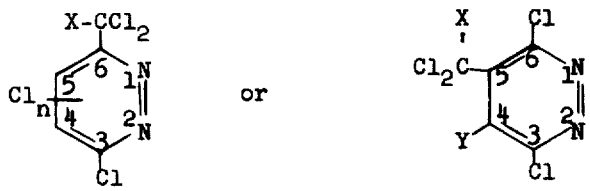

In this and succeeding formulae, X represents chlorine or hydrogen, Y represents chlorine or hydrogen and $n$ represents the integer 1 or 2.

Representative compounds of the present invention include 3,4-dichloro-6-(dichloromethyl)pyridazine;
3,5-dichloro-6-(dichloromethyl)pyridazine;
3,4,5-trichloro-6-(dichloromethyl)pyridazine;
3,6-dichloro-5-(dichloromethyl)pyridazine;
3,4,6-trichloro-5-(dichloromethyl)pyridazine;
3,4-dichloro-6-(trichloromethyl)pyridazine;
3,5-dichloro-6-(trichloromethyl)pyridazine;
3,4,5-trichloro-6-(trichloromethyl)pyridazine;
3,6-dichloro-5-(trichloromethyl)pyridazine and
3,4,6-trichloro-5-(trichloromethyl)pyridazine.

The compounds of the present invention are crystalline solids or liquids of low solubility in water and high solubility in common organic solvents such as chloroform, benzene, methylene chloride or dimethyl formamide. These compounds have been found to have utility in the kill and control of bacterial and fungal organism at low dosage rates.

The chlorine substituted methyl pyridazine compounds of the present invention can be prepared by the liquid phase chlorination of a chlorine substituted methyl pyridazine in the presence of dimethylformamide or by the pressure chlorination of a methyl pyridazine in carbon tetrachloride.

In one method for carrying out the reaction, chlorine gas is bubbled into dimethyl formamide until it is saturated and thereafter the chlorine substituted methyl pyridazine is slowly added thereto. The reaction mixture is maintained under agitation and at a temperature of from about 40° to about 110°C. for a period of from about 5 to about 13 hours with a continuous flow of chlorine through the mixture. Upon completion of the reaction, the mixture is cooled and poured into ice water. The solution is thoroughly extracted with a solvent such as chloroform, benzene, carbon tetrachloride or methylene chloride. The extract is washed with water to remove any dimethylformamide remaining. The extract is dried and the solvent removed by evaporation under reduced pressure. The oily residue which remains is distilled to separate the various chlorinated methyl pyridazine products.

In an alternative procedure, the starting chlorine substituted methyl pyridazine in carbon tetrachloride is placed in a pressure chlorination vessel and chlorinated at a temperature of from about 100° to about 140°C. under a pressure of 250 psig. Upon completion of the reaction, the reaction vessel is vented and the carbon tetrachloride removed from the reaction product by evaporation under reduced pressure. The liquid residue is set aside and any product crystals which form are removed. The mother liquor is thereafter distilled in vacuo to separate additional products.

In both of the above operations, more than one product is prepared during the reactions and these can be separated from each other by conventional techniques of crystallization, distillation or column chromatography. For example, when 3,6-dichloro-5-methylpyridazine is chlorinated in dimethylformamide both 3,4,6-trichloro-5-(dichloromethyl)pyridazine and 3,4,6-trichloro-5-(trichloromethyl)pyridazine are prepared; when 3,6-dichloro-5-methyl pyridazine is chlorinated in carbon tetrachloride, 3,6-dichloro-5-(dichloromethyl)pyridazine 3,6-dichloro-5-(trichloromethyl)pyridazine and 3,4,6-trichloro-5-(trichloromethyl)pyridazine are formed and when 3-chloro-6-methyl pyridazine is chlorinated in dimethylformamide, 3,4,5-trichloro-6-(trichloromethyl)pyridazine, 3,5-dichloro-6-(trichloromethyl)pyridazine and 3,4-dichloro-6-(trichloromethyl)pyridazine are prepared. As indicated above, these products can be separated from the product mix by conventional techniques.

DESCRIPTION OF SOME PREFERRED EMBODIMENTS

The following examples illustrate the present invention and the manner by which it can be practiced but, as such should not be construed as limitations upon the overall scope of the same.

EXAMPLE I

Chlorine gas was bubbled through 40 milliliters of dimethylformamide until the temperature reached 75°C. To this mixture was slowly added with agitation 20 grams of 3,6-dichloro-5-methyl pyridazine, the rate of addition being such so as to maintain the temperature at 75°C. The mixture was thereafter heated to 100°C. and maintained under agitation, with a continuing flow of chlorine gas, for ten (10) hours. Upon completion of the reaction, the reaction mixture was poured into ice water and stirred for 30 minutes. The mixture was thereafter extracted repeatedly with chloroform and the combined chloroform extracts washed with water to remove dissolved dimethylformamide. After separation the extract was dried over anhydrous magnesium sulfate and the solvent removed by evaporation under reduced pressure. The oil which remained as a residue was distilled into 3 cuts.

The first cut (30° – 60° at 0.2 millimeters of mercury (mm)) of 2.8 grams consisted of tetrachloropyridazine and a trace of 3,4,6-trichloro-5-(dichloromethyl)-pyridazine. The second cut (110°C. at 0.5 mm) of 11.7 grams consisted of greater than 95 percent 3,4,6-trichloro-5-(dichloromethyl)pyridazine, having a melting point of 84°–86°C., which upon analysis was found to have carbon, hydrogen and nitrogen contents of 23.3, 0.7 and 11.0 percent, respectively, as compared with the theoretical contents of 22.6, 0.4 and 10.5, percent, respectively, calculated for the above named structure; the remainder being tetrachloro pyridazine. The third cut (110°–120°C. at 0.5 mm) was identified by mass spectra to consist of tetrachloro pyridazine and various pentachloromethylpyridazines. The pot residue was found by mass spectrum analysis to consist of 3,4,-6-trichloro-5-(dichloromethyl)-pyridazine in a yield of 10 percent of the residue, and three unidentified materials.

EXAMPLE II

Dimethylformamide (20 milliliters) was saturated at room temperature with chlorine gas. To this solution was slowly added 10 grams of 3-chloro-6-methylpyridazine while the temperature was maintained below 50°C. Chlorine gas was continuously added and the mixture was heated to 130°C. and maintained there while under agitation for 6 hours. The chlorine flow was stopped and the reaction mixture allowed to cool to room temperature. The cooled mixture was poured into ice water and maintained therein under agitation, (about 12–16 hours). The mixture was thoroughly extracted with chloroform and the extract was washed with water to remove all dimethylformamide and dried over anhydrous magnesium sulfate. The solvent was removed by evaporation under reduced pressure having a thick oil as a residue. Distillation of the residual oil provided 3.54 grams of 3,4,5-trichloro-6-(trichloromethyl)pyridazine and 6.7 grams of an additional oil composed of 3,5-dichloro-6-(trichloromethyl)pyridazine (52 percent of total) and 3,4-dichloro-6-(trichloromethyl)pyridazine (48 percent of total). Purification of the first fraction by column chromatography gave pure 3,4,5-trichloro-6-(trichloromethyl)pyridazine having a melting point of 55°–56°C. which was further found by analysis to have carbon, hydrogen and nitrogen contents of 22.7, 0.7 and 10.5 percent, respectively, as compared with the theoretical contents of 22.5, 0.4 and 10.6 percent, respectively, calculated for the above named structure.

EXAMPLE III

A solution comprising 38 grams of 3,6-dichloro-5-methyl pyridazine in 500 milliliters of carbon tetrachloride was placed in a pressure chlorination vessel and chlorinated at temperature between 100°–140°C. and a pressure of 90–160 psig for 13 hours. (During the reaction, a temperature controller failed and the temperature rose to 240°C. for about 2 ½ hours). Upon completion of the reaction, the solvent was removed by evaporation under reduced pressure and the liquid residue which remained was set aside. The crystals which formed were removed by filtration and 13 grams of 3,6-dichloro-5-(trichloromethyl)-pyridazine was recovered. The product had a melting point of 116°–118°C. and was found by analysis to have carbon, hydrogen and nitrogen contents of 22.7, 0.7 and 10.5 percent, respectively, as compared with the theoretical contents of 22.5, 0.4 and 10.6 percent, respectively, calculated for the above named structure.

The structure of the compound was confirmed by infrared analysis, N.M.R. and mass spectral analysis.

By following the general procedures and employing the same feed of Example III, the following compounds are prepared.

3,6-Dichloro-5-(dichloromethyl)pyridazine and
3,4,6-Trichloro-5-(trichloromethyl)pyridazine.

By following the general procedures of Example III and employing 3-chloro-6-methyl pyridazine as a feed, the following compounds are prepared 3,4-Dichloro-6-(dichloromethyl)pyridazine;
3,5-Dichloro-6-(dichloromethyl)pyridazine and
3,4,5-Trichloro-6-(dichloromethyl)pyridazine.

The compounds of the present invention are employed as toxicants in bacteriocides and fungicides. For such uses, the compounds can be employed in an unmodified form or dispersed on a finely divided solid and employed as dusts. Such mixtures can also be dispersed in water with or without the aid of a surface active agent and the resulting aqueous suspensions employed as sprays. In other procedures, the products can be employed as active constituents in solvent solutions, oil-in-water or water-in-oil emulsions or aqueous dispersions. The augmented compositions are adapted to be formulated as concentrates and subsequently diluted with additional liquid or solid adjuvants to produce the ultimate treating compositions.

Excellent results are obtained when employing compositions containing the toxicant in concentrations usually from about 0.1 to about 10,000 parts or more by weight of one or more of the compounds per million parts of such compositions.

In a representative operation, each of the compounds 3,5-dichloro-6-(trichloromethyl)pyridazine, 3,6-dichloro-5-(trichloromethyl)pyridazine, 3,4,5-trichloro-6-(trichloromethyl)pyridazine and 3,4,6-trichloro-5-(dichloromethyl)pyridazine when applied as the sole toxicant in a nutrient agar at a concentration of 100 parts by weight per million parts of agar were found to give 100 percent kill and control of the organisms Candida albicans, Trichophyton mentagrophytes, Bacillus subtilis, Aspergillus terreos, Candida pellicolosa, Pullularia pullolans, Mycobacterium phlei, Ceratocystis IPS, Cephaloaseus fragans and Trichoderm Sp. Additionally, each of the compounds 3,4,-5-trichloro-6-(trichloromethyl)pyridazine, 3,4,6-trichloro-5-(dichloromethyl)pyridazine and 3,6-dichloro-5-(dichloromethyl)pyridazine were also found to give 100 percent kill and control of the organisms Trichphyton mentagrophytes and Cephaloaseus fragans at toxicant concentrations of about 1 part by weight per million parts of agar.

In an additional operation, each of the compounds 3,4,6-trichloro-5-(dichloromethyl)pyridazine and 3,6-dichloro-5-(trichloromethyl)pyridazine when applied as the sole toxicant in a nutrient agar at a concentration of 100 parts by weight per million parts of agar were found to give 100 percent kill and control of the organisms Staphylococcus aureus, Escherichia coli and Salmonella typhosa.

In additional operations employing the same toxicant concentration in nutrient agar, each of the compounds 3,4,5-trichloro-6-trichloromethyl)pyridazine, 3,6-dichloro-5-(trichloromethyl)pyridazine and 3,5-dichloro-6-(trichloromethyl)pyridazine were found to give 100 percent kill and control of the organism Rhizopus nigricans.

What is claimed is:

1. A compound corresponding to one of the formulas

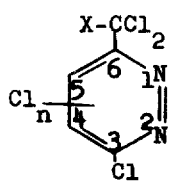 or 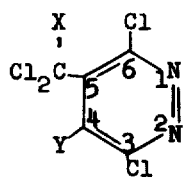

wherein X represents chlorine or hydrogen, Y represents chlorine or hydrogen and n represents the integer 1 or 2.

2. The compound of claim 1 wherein the compound corresponds to the formula

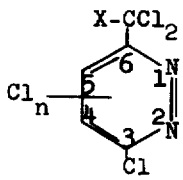

3. The compound of claim 2 wherein X is chlorine.

4. The compound of claim 2 which is 3,5-dichloro-6-(trichloromethyl)pyridazine.

5. The compound of claim 2 which is 3,4,5-trichloro-6-(trichloromethyl)pyridazine.

6. The compound of claim 1 wherein the compound corresponds to the formula

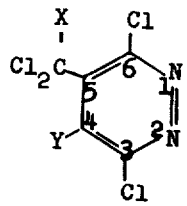

7. The compound of claim 6 wherein Y represents chlorine.

8. The compound of claim 7 which is 3,4,6-trichloro-5-(dichloromethyl)pyridazine.

9. The compound of claim 6 wherein X represents chlorine.

10. The compound of claim 9 which is 3,6-dichloro-5-(trichloromethyl)pyridazine.

* * * * *